United States Patent [19]

Kimura

[11] 4,347,534
[45] Aug. 31, 1982

[54] AUTO-TRACKING SYSTEM FOR MAGNETIC TAPE RECORDING DEVICE

[75] Inventor: Kenji Kimura, Tachikawa, Japan

[73] Assignee: Olympus Optical Co., Ltd., Tokyo, Japan

[21] Appl. No.: 220,180

[22] Filed: Dec. 23, 1980

[30] Foreign Application Priority Data

Jan. 18, 1980 [JP] Japan .................................. 55-4297

[51] Int. Cl.³ ........................................... G11B 21/10
[52] U.S. Cl. ....................................... 360/77; 360/21
[58] Field of Search ..................... 360/76, 77, 78, 106, 360/21

[56] References Cited

U.S. PATENT DOCUMENTS 2,938,962 5/1960 Konins et al. ......................... 360/76
4,007,493 2/1977 Behr et al. ............................ 360/77
4,149,198 4/1979 Behr et al. ............................ 360/77

Primary Examiner—John H. Wolff
Attorney, Agent, or Firm—Frishauf, Holtz, Goodman & Woodward

[57] ABSTRACT

A pair of detecting heads are disposed in positions corresponding respectively to single heads at both ends of a multichannel head unit, symmetrically inclined with respect to the tape traveling direction. The center positions of these detecting heads are severally in alignment with the center positions of tracks of a magnetic tape. The phase difference between track playback signals reproduced respectively by these detecting heads is detected, and a tracking error is corrected in accordance with the phase difference.

9 Claims, 8 Drawing Figures

AUTO-TRACKING SYSTEM FOR MAGNETIC TAPE RECORDING DEVICE

BACKGROUND OF THE INVENTION

This invention relates to a magnetic recording-reproducing device, and more specifically to an auto-tracking system of a magnetic recording-reproducing device for video signals.

In a magnetic recording-reproducing device, it generally becomes more difficult to maintain a normal tracking position as the track width is reduced. Under the existing circumstances, such maintenance depends on the mechanical accuracy of a tape driving system. However, there is a limit in the improvement of the mechanical accuracy, and such improvement will cause an increase in cost.

The object of this invention is to provide an auto-tracking system capable of detecting the phase difference between signals reproduced severally from at least two magnetic tracks and correcting a tracking error in accordance with such phase difference.

SUMMARY OF THE INVENTION

According to this invention, there is provided an auto-tracking system in which two detecting heads are inclined and are symmetrically disposed in positions corresponding respectively to magnetic heads at both ends of a multichannel head unit, and in which the phase difference between signals reproduced by the detecting heads from magnetic tracks corresponding thereto is detected by a phase comparator so that a tracking error may be corrected in accordance with the phase difference.

DETAILED DESCRIPTION

Figure 1:
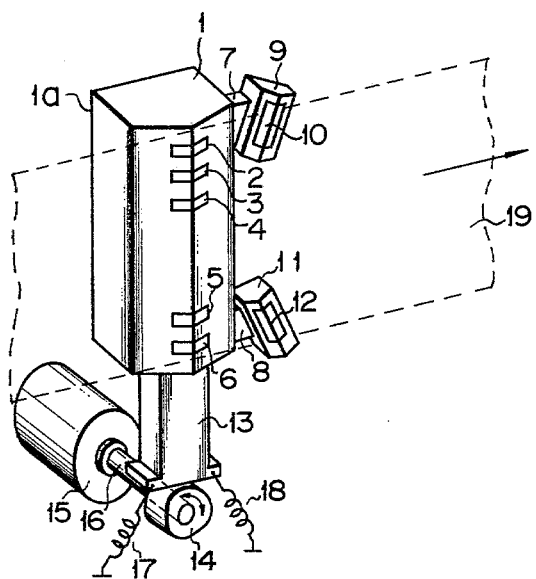
FIG. 1 is a perspective view of a magnetic head unit of an auto-tracking system according to an embodiment of this invention.

In FIG. 1, a multichannel head unit 1 comprises of a plurality of magnetic heads 2, 3, 4, 5 and 6 and an envelope 1a holding these magnetic heads. Tracking detecting heads 9 and 11 are slantly disposed in positions corresponding respectively to the magnetic heads 2 and 6 at both ends of the multichannel head unit 1, and are fixed to the multichannel head unit 1 by means of support members 7 and 8, respectively. The multichannel head unit 1 is so disposed as to be able to move in a direction perpendicular to the longitudinal direction of a magnetic tape 19, and is vertically moved by a cam 14 through a transmission member 13 under the multichannel head unit 1. The cam 14 is coupled to a shaft 16 of a reversible DC motor 15, and rotates in accordance with the rotation of the motor 15 to vertically move the multichannel unit 1 by means of the transmission member 13. Springs 17 and 18 continually apply downward torque to the multichannel head unit 1, and also maintain the transmission member 13 always in contact with the cam 14.

Figure 2:
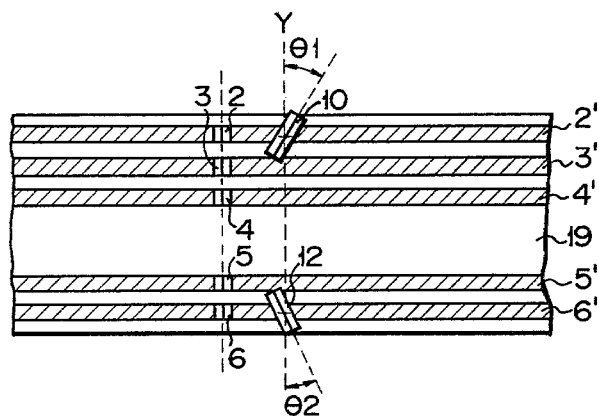
FIG. 2 shows the positional relationships between magnetic heads and recording tracks in a normal tracking state.

In FIG. 2, there are shown the geometrical positional relationships between the magnetic heads 2 to 6 of the multichannel head unit 1, respective head sections 10 and 12 of the detecting heads 9 and 11, and magnetic tracks 2', 3', 4', 5' and 6' having already undergone recording. FIG. 2 shows a state in which the heads 2 to 6 of the multichannel head unit 1 are coincident with the widths of the recording tracks 2' to 6', that is, a normal tracking state. The tracking detecting head sections 10 and 12 are inclined respectively at azimuth angles of $\theta_1$ and $\theta_2$ to a vertical axis Y (i.e. central axis of the multichannel head unit 1). Here there is a relation $\theta_1 = \theta_2$. The angles $\theta_1$ and $\theta_2$ are to be maximized within a range at least to allow the levels of the outputs from the head sections 10 and 12 of the tracking detecting heads to be detected although they are reduced by azimuth loss. The reason is that the greater the angles $\theta_1$ and $\theta_2$, the higher the tracking accuracy will be, as mentioned later. Further, the tracking detecting head sections 10 and 12 are inclined in order to cause a phase difference between output signals reproduced by the head sections 10 and 12 when the tracks 2' to 6' of the magnetic tape 19 are coincident with the magnetic heads 2 to 6. This phase difference serves as information to represent a tracking error. In this embodiment, recording signals recorded on the magnetic tracks are video signals, which are band-divided into multichannel video signals. In these video signals, horizontal synchronizing signals are inserted in the horizontal blanking signal, and are used as detected signals for time base correction in a reproducing operation. The horizontal synchronizing signals are reproduced by the head sections 10 and 12 of the tracking detecting heads, and used as detected signals for tracking. In the case of video signals, the detected signals may be vertical synchronizing signals. In short, the detected signals need only be regular continuous signals which can be separated from luminance signals. With a recording-reproducing device for PCM signals, e.g. initial bit signals (continuously existing address signals) can be separated into original code signals to be used as detected signals for tracking.

Figure 3:
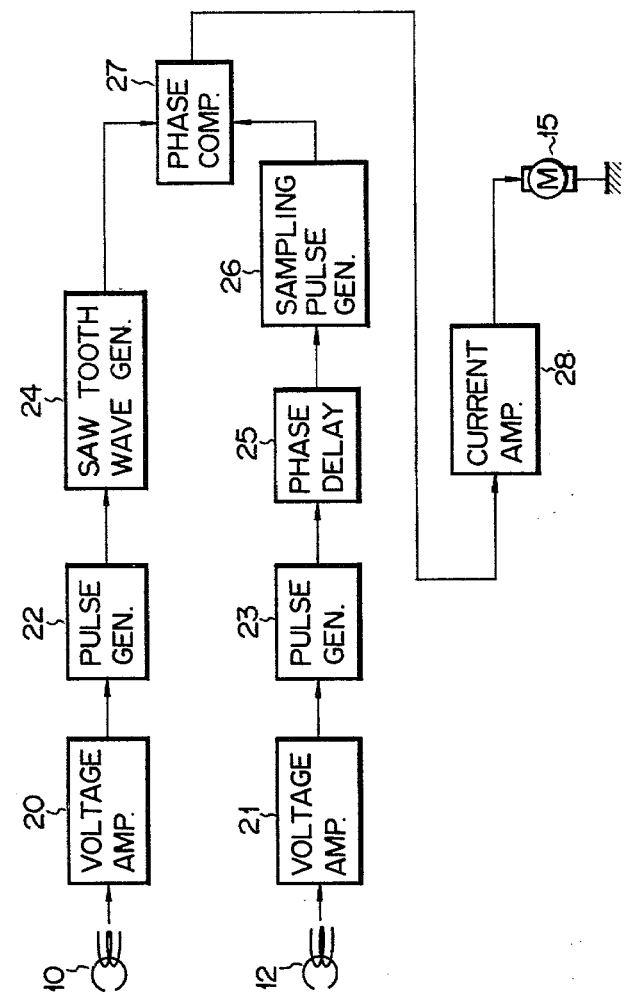
FIG. 3 is an electrical circuit diagram of the auto-tracking system.
Figure 4:
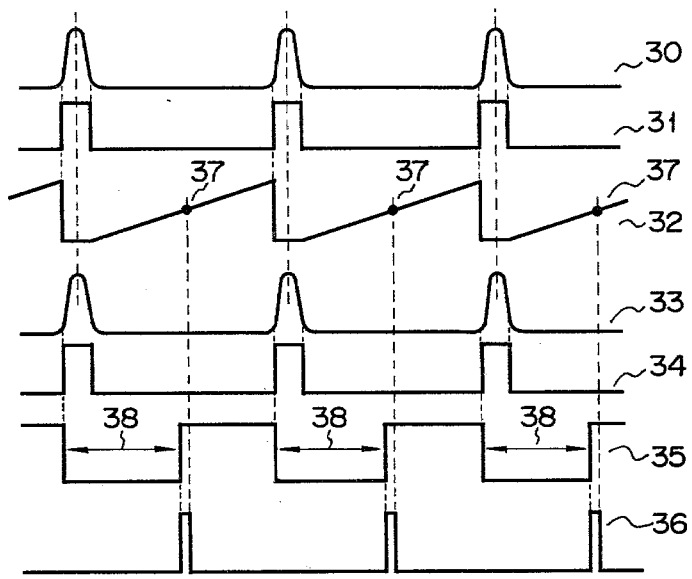
FIG. 4 is a time chart showing signals of the auto-tracking circuit in the normal tracking state.
Figure 5:
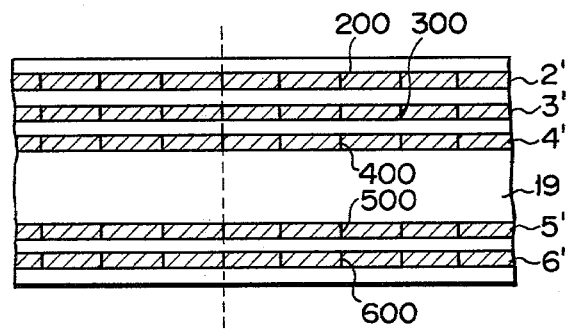
FIG. 5 shows recording patterns of video signals recorded on a magnetic tape.
Figure 6:
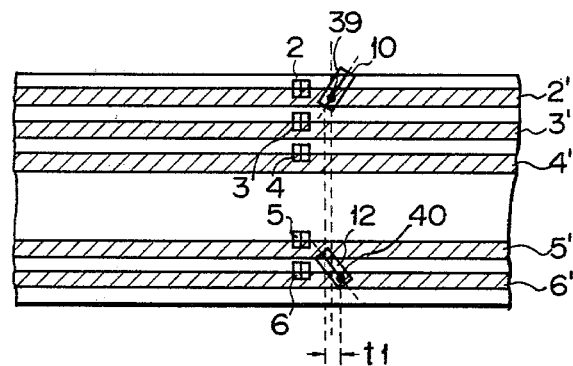
FIG. 6 shows the positional relationships between the magnetic heads and the recording tracks obtained in the case of an upward tracking error.
Figure 7:
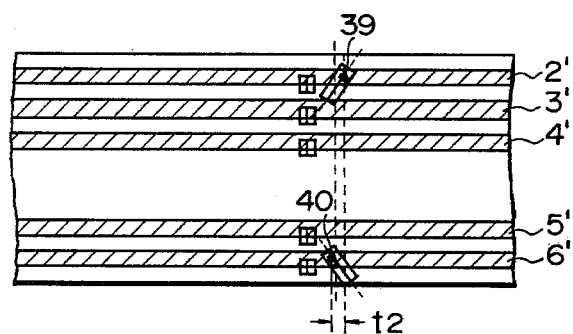
FIG. 7 shows the positional relationships between the magnetic heads and the recording tracks obtained in the case of a downward tracking error.
Figure 8:
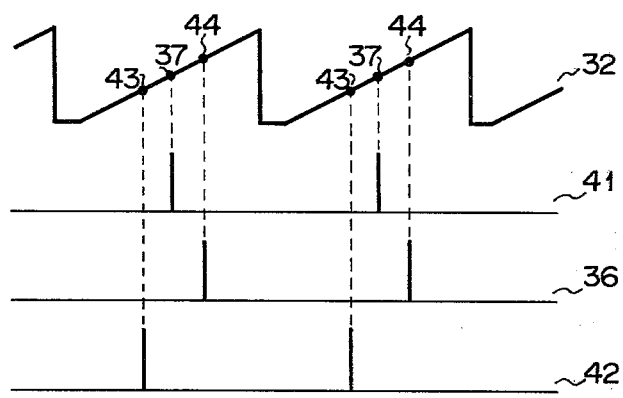
FIG. 8 is a time chart showing signals obtained when the tracking error is caused.

FIG. 3 shows an electric circuit of the auto-tracking system, in which horizontal synchronizing signals reproduced by the tracking detecting head sections 10 and 12 are voltage-amplified by voltage amplifiers 20 and 21, and supplied to pulse generators 22 and 23. The pulse generators 22 and 23 convert output signals from the voltage amplifiers 20 and 21 into pulse signals. An output pulse from the pulse generator 22 triggers a sawtooth wave generator 24, while an output pulse from the pulse generator 23 is delayed by a phase delay circuit 25 and triggers a sampling pulse generator 26. The output of the sampling pulse generator 26 serves as one input of a phase comparator 27, the other input of which is supplied with a sawtooth wave signal from the sawtooth wave generator 24. At the output of the phase comparator 27 appears a DC voltage in proportion to the phase difference between the sawtooth wave and the sampling pulse. In a normal tracking state, however, there is no phase difference between the reproduced horizontal synchronizing signals from the tracking detecting head sections 10 and 12, and the amount of delay of the phase delay circuit 25 is adjusted as shown in FIG. 4 so that the output voltage of the phase comparator 27 may be 0 V. FIG. 4, shows horizontal synchronizing signals 30 and 33 voltage-amplified by the voltage amplifiers 20 and 21, output signals 31 and 34 of the pulse generators 22 and 23, output voltage 32 of the sawtooth wave generator 24, output voltage 35 of the phase delay circuit 25, delay amount 38, output signal 36 of the sampling pulse generator 26 triggered by a delay signal, and sampling positions 37 in the phase comparator 27 in the normal tracking state. In recording, the horizontal synchronizing signals are simultaneously written in all of the tracks, so that the actual magnetic recording patterns are such that the horizontal synchronizing signals are arranged on the same line, as shown in FIG. 5. In FIG. 5, numerals 2', 3', 4', 5' and 6' designate tracks for signals recorded on the tape, while numerals 200, 300, 400, 500 and 600 designate the horizontal synchronizing signals recorded respectively on these tracks. If the traveling position of the magnetic tape 19 in a reproducing operation is shifted downward from a position for recording, the geometrical positions of the magnetic tape 19 and the tracking detecting head sections 10 and 12 are as shown in FIG. 6. In FIG. 6, numerals 38 and 40 designate the central positions of the recording tracks 2' and 6', respectively. The tracking detecting head sections 10 and 12 are wider than the track width of each of the magnetic heads 2 to 6 by a length about twice as great as the track width of a guard band between two adjacent tracks. Accordingly, the horizontal synchronizing signals may be reproduced normally if the tracking position is shifted, though the timing for the reproduction of the horizontal synchronizing signals will be staggered due to the inclination of the detecting head sections. In FIG. 6, the phase difference between the reproduced horizontal synchronizing signals from the tracking detecting head section 10 and 12 is $t_1$; the signal reproduced by the head section 10 appears ahead of the signal reproduced by the head section 12 by $t_1$. If the traveling position of the magnetic tape 19 is shifted downward from the position for recording, the horizontal synchronizing signal reproduced by the head section 12 appears ahead of the horizontal synchronizing signal reproduced by the head section 10 by $t_2$, as shown in FIG. 7. In consequence, as shown in FIG. 8, the sampling points of the sampling pulses as against the sawtooth wave move to vary the output voltage of the phase comparator 27 according to the tracking state. In FIG. 8, numerals 41 and 37 designate a sampling pulse phase and sampling potential obtained in the normal tracking state. Numerals 36 and 44 designate a sampling pulse phase and sampling potential obtained when the position of the magnetic tape in the reproducing operation is shifted downward, as shown in FIG. 6. Numerals 42 and 43 designate a sampling pulse phase and sampling potential obtained when the position of the magnetic tape is shifted upward, as shown in FIG. 7. According to this invention, as described above, a tracking error voltage corresponding to the vertical shifting of the magnetic tape is produced as the output voltage of the phase comparator 27, and the relative positions of the multichannel head unit and the recording tracks of the magnetic tape are automatically corrected for ever-optimum tracking by current-amplifying the tracking error voltage and subjecting the reversible motor 15 to negative feedback control.

What is claimed is:

1. An auto-tracking system for a multichannel head unit having a plurality of transducers for respective channels, comprising:
    a pair of detecting heads having respective center posiitions disposed in positions corresponding respectively to at least two transducers of the multichannel head unit and in close vicinity to a magnetic tape having a plurality of recording tracks, said detecting heads being symmetrically inclined with respect to a tape traveling direction and arranged so that respective center positions of said detecting heads are each in alignment with center positions of the corresponding respective recording tracks of said magnetic tape;
    said detecting heads each having a track width greater than that of each of said transducers of said multichannel head unit within a range not reaching a transducer adjacent to the transducer associated with the respective detecting head so as to reproduce signals regularly continuously recorded on the respective recording tracks of said magnetic tape;
    tracking error detecting means coupled to said detecting heads for detecting as a tracking error signal a relative change in phase of the reproduced signals from said two detecting heads; and
    reproducing position correcting means coupled to said tracking error detecting means for correcting the positions of at least one of said multichannel head unit, said detecting heads, and said magnetic tape in accordance with the tracking error signal from said tracking error detecting means.

2. An auto-tracking system according to claim 1, wherein said detecting heads are fixed to said multichannel head unit.

3. An auto-tracking system according to claim 1 or 2, wherein said detecting heads have the same azimuth angle to a direction perpendicular to the traveling direction of said magnetic tape.

4. An auto-tracking system according to claim 3, wherein said azimuth angle is fixed to the greatest value to allow outputs from said detecting heads to be detected.

5. An auto-tracking system according to claim 1, wherein said tracking error detecting means includes:
    first pulse generating means for converting one of the signals severally reproduced by said detecting heads into a first pulse signal;
    second pulse generating means for converting the other of said reproduced signals from said detecting heads into a second pulse signal;
    sawtooth generating means coupled to said first pulse generating means for converting said first pulse signal into a sawtooth signal;
    means coupled to said second pulse generating means for delaying the phase of said second pulse signal;
    a sampling pulse generator coupled to said phase delaying means for producing a sampling pulse signal in response to an output signal from said phase delaying means; and
    means coupled to said sawtooth generating means and to said sampling pulse generator for comparing the sampling pulse signal from said sampling pulse generator with said sawtooth signal to detect the phase difference therebetween.

6. An auto-tracking system according to claim 1, wherein said reproducing position correcting means comprises means coupled to said tracking error detecting means for moving said multichannel head unit in a direction perpendicular to the tape driving direction as a function of said tracking error signal.

7. An auto-tracking system according to claim 6, wherein said moving means comprises a reversible motor rotating in accordance with said tracking error signal; and cam means rotated by said reversible motor and engaging said multichannel head unit.

8. An auto-tracking system according to claim 1 or 5, wherein said regular continuous signals recorded on said recording tracks are respective horizontal synchronizing signals of video signals.

9. An auto-tracking system according to claim 1 or 5, wherein said detecting heads are disposed at positions corresponding to the positions of said transducers at both ends of said multichannel head unit.

* * * * *